(12) United States Patent
Moore et al.

(10) Patent No.: US 8,768,351 B2
(45) Date of Patent: Jul. 1, 2014

(54) CIRCUIT-SWITCHED CALL DELIVERY

(71) Applicant: Hewlett-Packard Development Company, L.P., Houston, TX (US)

(72) Inventors: Tiffany A. Moore, Omaha, NE (US); Mark A. Montz, Elkhorn, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/628,341

(22) Filed: Sep. 27, 2012

(65) Prior Publication Data

US 2014/0087725 A1     Mar. 27, 2014

(51) Int. Cl.
  *H04W 4/00*   (2009.01)

(52) U.S. Cl.
  USPC .......................................... 455/433; 455/435.1

(58) Field of Classification Search
  USPC .................. 455/433, 432.1, 435.1–435.3, 445
  See application file for complete search history.

(56) References Cited

U.S. PATENT DOCUMENTS

| | | | |
|---|---|---|---|
| 5,915,220 A * | 6/1999 | Chelliah | 455/435.2 |
| 2010/0029248 A1 * | 2/2010 | Shi et al. | 455/411 |
| 2010/0080171 A1 | 4/2010 | Rune et al. | |
| 2011/0069618 A1 | 3/2011 | Wong et al. | |
| 2011/0081907 A1 * | 4/2011 | Yang et al. | 455/433 |
| 2011/0256873 A1 | 10/2011 | Vikberg et al. | |
| 2011/0306331 A1 | 12/2011 | Gupta et al. | |
| 2012/0302234 A1 * | 11/2012 | Wallis et al. | 455/433 |
| 2013/0237213 A1 * | 9/2013 | Tian et al. | 455/432.1 |

FOREIGN PATENT DOCUMENTS

WO  WO-2012/045375 A1  4/2012

OTHER PUBLICATIONS

3GPP TS 23.018, V10.1.0 (Mar. 2011), Technical Specification, 3rd Generation Partnership Project, Technical Specification Group Core Network and Terminals, Basic Call Handling, Technical realization, (Release 10), Mar. 2011, pp. 1-289, 3GPP Organizational Partners, France, Available at: <3gpp.org/ftp/Specs/html-info/23018.htm>.

* cited by examiner

*Primary Examiner* — Brandon Miller
(74) *Attorney, Agent, or Firm* — Milin Patel

(57) ABSTRACT

Example embodiments disclosed herein relate to implementing circuit-switched call delivery. A mobile terminating call for user equipment (UE) is received. A first mobile switching center is determined to perform a first call termination attempt for the mobile terminating call by sending a provide roaming number (PRN) request with a pre-paging supported parameter to the first MSC. The first call termination attempt can include instructing the UE to return to a CS network domain to receive the call. A message indicating that the UE is not connected to the first MSC is received. It is determined whether the UE is in a registration process within a duration of time. If the registration succeeds, a second call termination attempt for the mobile terminating call is made via the second MSC.

15 Claims, 4 Drawing Sheets

CIRCUIT-SWITCHED CALL DELIVERY

BACKGROUND

Mobile devices have become increasingly popular. Moreover, advancements in technology have resulted in development of various mobile communication standards for delivering high-capacity data and voice services to the mobile devices. Users of mobile devices are constantly moving, thereby roaming and camping in different networks. Network service providers are challenged to provide high quality voice and data services as mobile devices roam and camp in networks.

BRIEF DESCRIPTION OF THE DRAWINGS

The following detailed description references the drawings, wherein.

DETAILED DESCRIPTION

Figure 1:
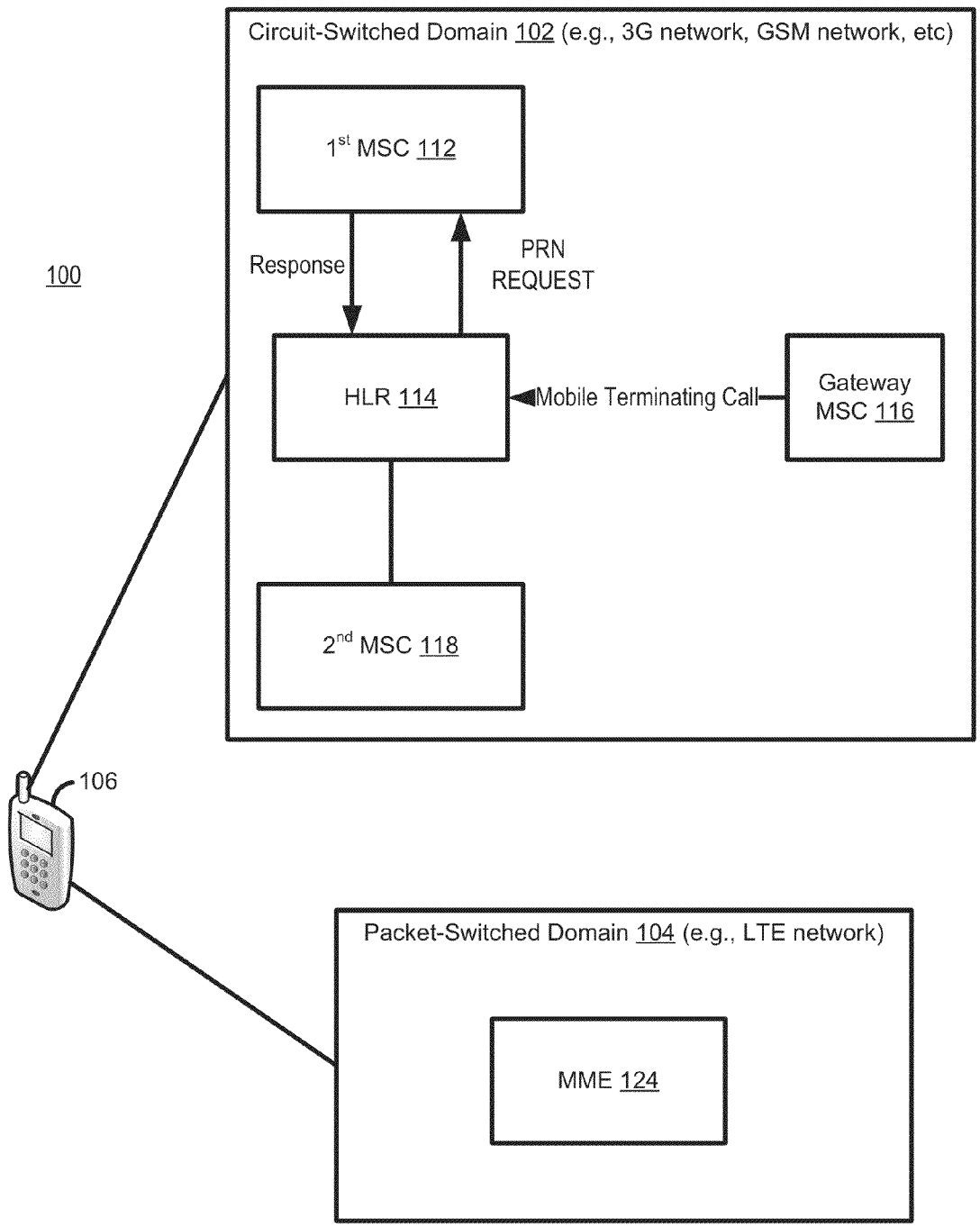
FIG. 1 is a block diagram of a network architecture for implementing a circuit-switched (CS) call delivery, according to one example.

Many mobile devices are capable of switching from one network to the other to receive desired services. For example, a mobile device may switch between a packet-switched (PS) network such as the third generation partnership project (3GPP) long term evolution (LTE) network to receive data, and a circuit-switched (CS) network to receive voice calls. The CS network may include, for example, a third generation (3G) network, a global system for mobile communications (GSM) network, a universal mobile telecommunications system (UMTS) network, time division multiple access (TDMA), and a code division multiple access (COMA) network.

The LTE, a PS domain network, is a high-speed, high-capacity data standard that is becoming increasing popular as more users acquire smartphones and desire high data rates. However, voice is still a very important service in mobile communications. Accordingly, it can be important that a mobile device is able to receive voice calls in the CS domain even while currently operating in the PS domain (e.g., a fallback from the PS domain to the CS domain to receive voice calls).

However, often mobile terminating calls (e.g., calls to a mobile device) are lost or undeliverable to the mobile device when the mobile device has moved beyond a radio footprint of an original (or last known) CS mobile switching center (MSC) that paged the mobile device for the incoming call. The result is in a problem where, although the mobile device has returned to a CS domain, the call is undeliverable because the mobile device is in a new CS MSC different from the original MSC with which the mobile device originally registered. In such a situation, the call may be routed to voicemail even though the user is available and the call should have been delivered to the user.

Using a mobile terminating roaming retry (MTRR), a standards based approach, to resolve this problem may be expensive because the MTRR solution requires changes to both a gateway MSC and a home location register (HLR). For example, significant hardware and software upgrade may be needed to implement the MTRR solution.

Accordingly, various embodiments disclosed herein relate to implementing CS call delivery. In one example, a CS node (e.g., a CS network registration node) is used for implementing the CS call delivery. In one embodiment, the CS node is an HLR. The CS call delivery can be similar to the MTRR feature in 3GPP and use messages and/or functionality of hardware of the telecommunication system in a similar way as the MTRR.

In one example, when a mobile terminating call is received at the HLR from a gateway MSC (e.g., based on a Send Routing Information (SRI) message sent from the gateway MSC to the HLR), the HLR determines which Visitor Location Register (VLR)/MSC is associated with the mobile device. This can be based on location data, for example, in the form of a data structure such as a database or table that tracks which VLR/MSC mobile devices are connected to. In certain examples, a single node is used for the VLR and the MSC. In other examples, one VLR can be associated with multiple MSCs. As such, communications can be made between the HLR and the respective VLRs. The MSCs can receive information from its VLR and can be used to communicate with the mobile devices.

The HLR then causes the MSC to perform a first call termination attempt. The call termination attempt can instruct the mobile device to return to the CS network domain to receive the call. In one example, the communications between the HLR and MSC can include sending a "Pre-Paging Supported" parameter in a Provide Roaming Number (PRN) Request to the MSC. The request can be sent via a VLR. This allows a Visitor Location Register (VLR) associated with the MSC to page the handset before responding to the PRN. The mobile device can be in a state when asked to return to the CS network domain. Examples of states include returning to the first MSC, registering at another MSC, and being out of range (e.g., dead battery, radio off, out of range of a tower, etc.).

In one example, the VLR/MSC generates and sends a message over the Gs interface to the LTE system to let the network know a call is incoming. In other examples, other messaging interfaces can be used. In one example, the Gs interface is an interface between a Service General Packet Radio Service (GPRS) Support Node (SGSN) and an MSC and/or VLR. The message via the Gs interface is sent to a first MSC of the CS domain, where the first MSC is a last registered MSC of the mobile device known to the HLR. The Gs message is to inform the mobile device of the incoming call and instruct the mobile device to return to the CS domain. The mobile device returns to the first MSC and the MSC/VLR determines the routing number to provide to the gateway MSC to route the call. The MSC/VLR sends the routing number to the HLR, which can send the routing number to the gateway MSC to complete the call.

In another example, the MSC/VLR responds with a message indicating that the subscriber mobile device is an "Absent Subscriber" or absent from the MSC. The message can be in the form of a type of reply to the PRN. If the response indicates that the mobile device has not returned to the first MSC (e.g., the subscriber is absent from the first MSC), a timer is set to determine if the mobile device will register with a second MSC in the CS domain. Thus, the HLR is able to determine whether or not a subscriber associated with the mobile device is truly absent (e.g., mobile device is powered off, outside coverage area, etc.) or whether the mobile device will soon register with another MSC. If registration with the second MSC occurs within the duration of time set by the timer, the call is delivered to the mobile device via the second MSC.

In one example, the duration of time is configurable by the HLR and the duration of time is a time sufficient for a mobile device returning to a CS domain to register with an MSC. In one embodiment, the duration of time is in the order of one second. If and when registration with the second MSC is completed within the duration of time, a second PRN is sent from the HLR to the second MSC/VLR, where the second PRN request is to obtain a second routing number usable for delivering the call to the mobile device. The second MSC/VLR can return the routing number to the HLR, which can forward the information to the gateway MSC. The gateway MSC can then complete the call.

If registration at a second MSC does not initiate and/or does not complete within the allotted time, the call can be completed as if the subscriber is absent. In certain examples, this can be completed by sending the call to voicemail.

In some examples, pre-paging is a means of using network resources in an efficient manner. Pre-paging in a telecommunication network refers to the case where the called mobile device is paged during the SRI/PRN procedure, for example, before the MSC/VLR returns the PRN to the gateway MSC to complete the call.

FIG. 1 is a block diagram of a mobile communications system including an HLR for implementing a CS call delivery, according to one example. System 100 includes, for example, a circuit-switched network domain 102, a packet-switched (PS) network domain 104, and user equipment (UE) 106. In certain examples, a UE 106 is a device used by an end-user to communicate. Examples of UEs 106 include mobile phones, personal digital assistants, laptop computers, desktop computers with a mobile broadband adapter, tablets, and other computing devices capable of communicating voice and data in both the CS domain 102 and the PS domain 104.

In certain examples, CS domain 102 may include a 3G network, a GSM network, a UMTS network, a W-CDMA network, a TD-SCDMA network, or any other circuit-switched network. The CS domain 102 can handle voice traffic in system 100. For example, the CS domain 102 may implement a dedicated communications channel between two network nodes for the duration of the connection. It should be noted that in certain embodiments, the CS domain 102 may also manage data traffic (e.g., short message service (SMS)). CS domain 102 may include first MSC 112, second MSC 118, HLR 114, and gateway MSC 116.

First MSC 112, second MSC 118, and gateway MSC 116 are responsible for routing voice calls and other network services (e.g., SMS, conference calls, FAX, and circuit-switched data) to mobile devices and UE 106 within the network service provider's network. Further, MSCs 112, 116, 118 may also set up and release end-to-end connections and handle mobility and hand-over requirements during a call. MSCs 112, 116, 118 may determine the location of a subscriber's UE 106 within the CS domain 102 and the PS domain 104. MSCs 112, 116, 118 may also interface with a public switched telephone network (PSTN) and all mobile-to-mobile calls and PSTN-to-mobile calls may be routed through MSCs 112, 116, 118. When the MSCs are referred to herein, associated VLRs can be used during implementation (e.g., as intermediaries or considered as the same node as the respective MSC).

In one example, mobile term calls to a subscriber's UE 106 are received at the gateway MSC 116. For example, the gateway MSC 116 interfaces with the PSTN and other networks, thereby providing a gateway function for the CS domain 102. In certain examples, the first MSC 112 is a last registered MSC of the UE 106 last known to the HLR 114. For example, the first MSC 112 may be a current serving MSC of the UE 106 (e.g., prior to camping on the PS domain 104). In other examples, the second MSC 118 is an MSC with which the mobile device is requesting registration (e.g., a neighboring MSC of the first MSC 112), for example, when returning to the CS domain 102. To illustrate, the UE 106 may leave the CS domain 102 and enter the PS domain 104, for example, for data services. Upon returning to the CS domain 102 (e.g., for a voice call), the UE 106 may return to a different MSC from which it the UE 106 was originally registered. Accordingly, the UE 106 may request or may be in a process of registering with the second MSC 118. In certain examples, the second MSC 118 is a visited MSC where the subscriber is currently located.

HLR 114 may store information associated with subscribers of mobile devices of the network provider's network. Information maintained by HLR 114 may include unique identifiers associated with subscribers (e.g., subscriber identity module (SIM) and international mobile subscriber identity (IMSI) information), subscriber telephone numbers, current location of subscriber mobile devices, and subscriber preferences. Accordingly, HLR 114 is able to identify a current serving MSC of the UE 106 based on information stored. HLR 114 may be communicatively coupled to the gateway MSC 116 to receive mobile terminating call destined for a particular subscriber. A mobile terminating call is an incoming call to a mobile device.

PS domain 104 may include, for example, an LTE network, a WLAN network, an IP network, or any packet-switched network for providing packet-switched services to UE 106 in the system 100. Packet-switched services may include voice-over internet protocol (VOIP) services and data services. PS domain 104 may include Mobility Management Entity (MME) 124 to provide mobility management functionality to the PS domain 104. For example, the MME 124 may page UE 106 camping in the PS domain 104. The PS domain 104 may communicate or interface with the CS domain 102 via the MME 124. For example, MME 124 may be communicatively coupled to one or more MSCs in the CS domain 102 via Gs and SGs, where Gs and SGs are industry standard interfaces.

When a mobile terminating call to UE 106 is received at the HLR 114, the HLR 114 determines which MSC (e.g., the first MSC 112) is known to be associated with the UE 106, for example, via a database. The HLR 114 can also look at a database to determine the capabilities of the MSC. For example, the HLR 114 can track the functionality of each MSC. Functionality may include whether the MSC supports a Pre-Paging Supported capability. In this scenario, if the first MSC 112 supports the capability, the HLR 114 can send a PRN request to the MSC 112 with the "Pre-Paging Supported" parameter in the PRN for the UE 106. The PRN causes the first MSC to notify the UE 106 of the call and to instruct the UE 106 to return to the CS domain 102 to receive the call. The first MSC 112 may page the UE 106 to return to the CS domain 102. Alternatively, or in addition, the first MSC 112 may communicate with MME 124 in the PS domain 104 and MME 124 may page the UE 106.

In response to the page, the UE 106 may return to the first MSC 112 (e.g., the MSC with which the UE 106 is registered), may return to the second MSC 118 (e.g., a different MSC than the one on which the UE 106 is registered), or may not respond (e.g., if it did not receive the page, the UE 106 is off, etc.). If the UE 106 returns to the first MSC 112, the first MSC 112 sends a message (e.g., an unstructured supplementary service data (USSD) message) providing a mobile station routing number (MSRN) for delivering the call to the UE 106.

If, however, the UE 106 does not return to the first MSC 112, an absent subscriber message (e.g., via a USSD message) is sent from the MSC 112 to the HLR 114. Then a timer is set at the HLR 114 to determine whether the UE 106 registers with the second MSC 118 within a duration of time. Accordingly, the HLR 114 determines whether the absent subscriber is a true absent subscriber where the UE 106 is shut down, unavailable, outside coverage area and the like, or a false absent subscriber where the UE 106 is in the process of registering with the second MSC 118. Based on the determination, false absent subscriber indication that lead to undeliverable calls to an available subscriber may be significantly reduced in the system 100. If the UE 106 registers with the second MSC 118 within the duration of time, HLR 114 sends a PRN request to the second MSC 118 to obtain a MSRN for delivering the call to the UE 106.

In certain examples, alternative approaches to this system can be used. In one example, when the call is received, the HLR 114 can make a decision to send the PRN request to the first MSC 112 based on a determination that the first MSC 112 includes support for pre-paging. If the first MSC 112 does not support pre-paging, another approach can be used. This other approach can use additional messages to perform similar functionality, however, because additional messages are used, the cost of the transaction may be higher.

In this example, the HLR 114 generates and sends an unstructured supplementary service data (USSD) message to the first MSC 112, where the first MSC 112 is a last registered MSC of the mobile device known to the HLR 114. The USSD message is to inform the UE 106 of the incoming call and to instruct the UE 106 to return to the CS domain 102. A response to the USSD is received from the first MSC 112 at the HLR 114. If the response indicates that the UE 106 has returned to the first MSC 112, the call is delivered to the UE 106 via the first MSC 112. If, however, the response indicates that the UE 106 has not returned to the first MSC 112 (e.g., the subscriber is absent from the first MSC 112), a timer is set to determine if the UE 106 will register with a second MSC 118 in the CS domain 102. Thus, the HLR 114 is able to determine whether or not a subscriber associated with the mobile device is truly absent (e.g., mobile device is powered off, outside coverage area, etc.) or whether the UE 106 will soon register with another MSC. If registration with the second MSC 118 occurs within the duration of time set by the timer, the call is delivered to the UE 106 via the second MSC 118.

In one example, the duration of time is configurable by the HLR 114 and the duration of time is a time sufficient for a mobile device returning to a CS domain 102 to register with an MSC. In one embodiment, the duration of time is in the order of one second.

In certain examples, when it is confirmed that the UE 106 has returned to the first MSC 112, a provide roaming number (PRN) request is sent from the HLR 114 to the first MSC 112, where the PRN request is to obtain a routing number usable for delivering the call to the UE 106. In other examples, when registration with the second MSC 118 is completed within the duration of time, a second PRN is sent from the HLR 114 to the second MSC 118, where the second PRN request is to obtain a another routing number usable for delivering the call to the UE 106. This approach can cost more, for example, the overhead USSD messages compared to the approach of sending the PRN request with pre-paging supported. However, it can be more compatible, for example, if the first MSC 112 does not support pre-paging.

In certain examples, the networks can include a non-GSM network and a GSM network, for example, an ANSI to GSM Interface (AGI) can be used in the implementation to be the single network element that can be used to control the call delivery.

Figure 2A:
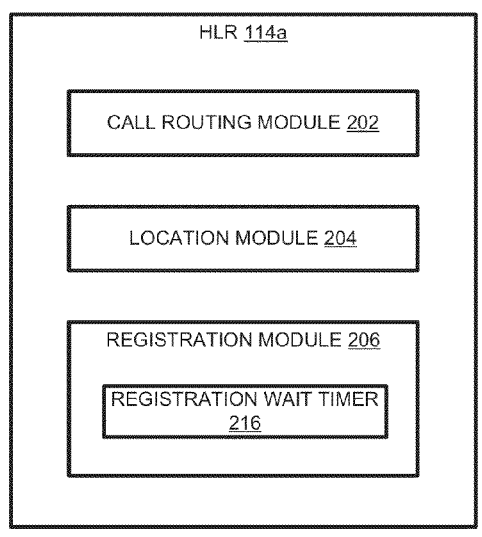
FIGS. 2A and 2B are block diagrams a home location register (HLR) for implementing a CS call delivery, according to various examples.
Figure 2B:
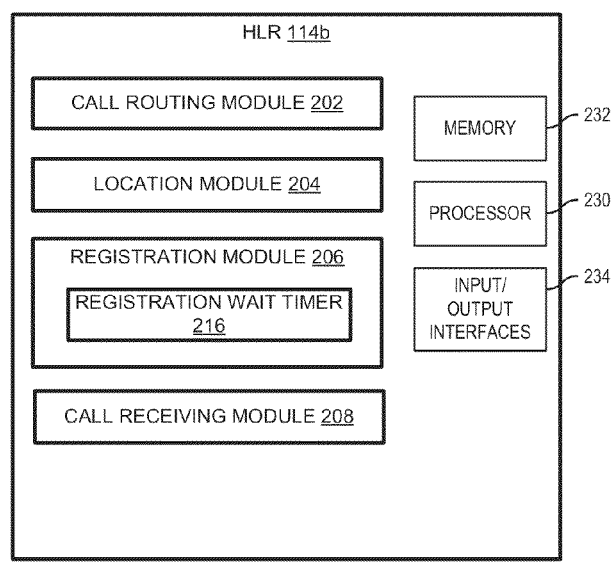

FIGS. 2A and 2B are block diagrams a home location register (HLR) for implementing a CS call delivery, according to various examples. In one example, HLR 114a includes a call routing module 202, a location module 204, and a call registration module 206. Registration module 206 includes a registration wait timer 216. In other examples, HLR 114b can include a call receiving module 208, a processor 230, a memory 232, and other input/output interfaces 234.

Call receiving module 208 may be configured to receive a mobile terminating call to a mobile device, such as UE 106. For example, the mobile terminating call may be received from gateway MSC 116. Call routing module 202 can receive the mobile terminating call from the receiving module 208 and use a location module 204 to determine where to route the call.

The location module 204 can determine what MSC the UE 106 is registered at or was last registered at. The determination can be looked up via a table, another database, or other lookup approach. In one example, the determined MSC is the first MSC 112. The process for a first call termination attempt can be made for the mobile terminating call. The process can include the call routing module sending a PRN request with a pre-paging supported parameter to the first MSC 112. In certain examples, the call routing module 202 can determine whether the first MSC 112 supports pre-paging before enabling the parameter. A database, such as a switch information file can be used to store such information about MSCs. The first call termination attempt can further include causing the MSC 112 to instruct the UE 106 to return to a CS network domain to receive the mobile terminating call. The MSC 112 can perform these operations and/or attempt to perform the operations.

As noted above, if the UE 106 returns to the first MSC 112, the first MSC 112 can send a message with the routing number to provide to the gateway MSC to route the call. If the UE 106 does not return to the first MSC 112, the first MSC 112 can send a message indicating that the UE 106 is not connected to the first MSC 112. In certain examples, not connected can mean that the UE 106 did not return to the first MSC. The message can be considered an absent subscriber message.

The call routing module 202 can receive the absent subscriber message. The call routing module 202 waits for a duration of time for the UE 106 to register with another MSC, e.g., the second MSC 118. The registration module 206 can determine whether the UE 106 has registered with the second MSC 118 or is in a process of registering with the second MSC 118. In one example, information about the UE 106 can be stored and read. The information can include the status of the UE 106 and whether it is in the process of authenticating and/or registering with another MSC. The information can be conveyed from MSCs to the HLR 114.

In an example embodiment, the registration wait timer 216 is set to determine whether the UE 106 registers with the second MSC 118 within the duration of time. The duration of time may be configured by the HLR 114 and may be in the order of one second. If the UE 106 registers with the second MSC 118 within the duration of time, the call routing module 202 obtains a second routing number from the second MSC 118 for delivering the call to the UE 106. This can occur by sending a PRN request to the second MSC 118 and receiving a response.

In some examples, registration can be monitored in two parts. In the first part, the registration module 206 can determine whether the UE 106 is attempting to register at a second MSC within a first period of time. If the UE 106 is in the process, a second timer can be set to determine if the registration is completed within a second duration of time.

If the UE 106 does not register with the second MSC 118 within the duration of time, the call may be delivered to a voicemail of the UE 106. This can occur by, for example, forwarding the mobile terminating call back to the first MSC, which treats the call as an absent subscriber. In this example, the UE 106 may be truly unavailable to receive the mobile terminating call. For example, the mobile device may be powered off, have a low battery, or outside a network coverage, and so on.

In some examples, the HLR 114 can determine whether first MSC 112, the second MSC 118, the UE 106, or a combination thereof is configured for a call termination retry service. In one example, the first MSC 112 can be considered configured for the retry service if the MSC 118 supports PRN with the pre-paging supported parameter. In another example, the UE 106 can be configured for the call termination retry service if it supports both a CS and PS domain.

A processor 230, such as a central processing unit (CPU) or a microprocessor suitable for retrieval and execution of instructions and/or electronic circuits can be configured to perform the functionality of any of the modules 202, 204, 206, 208 described herein. In certain scenarios, instructions and/or other information, such as database information, location information, etc., can be included in memory 132 or other memory. Input/output interfaces 234 may additionally be provided by the HLR 114 (e.g., for support, configuration, etc.). For example, input devices (not shown), such as a keyboard, a sensor, a touch interface, a mouse, a microphone, etc. can be utilized to receive input from an environment surrounding the HLR 114. Further, an output device (not shown), such as a display, can be utilized to present information to users. Examples of output devices include speakers, display devices, amplifiers, etc. Moreover, in certain embodiments, some components can be utilized to implement functionality of other components described herein.

Each of the modules 202, 204, 206, 208 may include, for example, hardware devices including electronic circuitry for implementing the functionality described herein. In addition or as an alternative, each module 202, 204, 206, 208 may be implemented as a series of instructions encoded on a machine-readable storage medium of HLR 114 and executable by processor 230. It should be noted that, in some embodiments, some modules are implemented as hardware devices, while other modules are implemented as executable instructions.

In some examples, the location module 204 can control a data structure, such as a database, table, etc. The data structure can include a bitmap for subscriber status. For example, the bitmap can include information as to whether the UE subscriber is currently attached, is registering, etc. Further, the information can include information about the location of the UE and/or how to connect to the UE (e.g., MSC/VLR identifier). When an attachment of the UE to a MSC/VLR occurs, the VLR/MSC can read the subscriber file and send an update to the HLR. In one example, the MSC can sense that the UE is attaching and send the information to an associated VLR, which can send the information to the HLR.

Further, in certain scenarios, the flow of communications can start with the gateway MSC sending an SRI to the HLR for the call. The HLR can then send a PRN to a registered MSC associated with the UE the call is intended for, the MSC can then provide a reply to the PRN (e.g., via an associated VLR), and the HLR can provide a reply to the SRI. In certain scenarios, another PRN is sent to the second MSC and the reply to the SRI is based on that communication.

Figure 3:
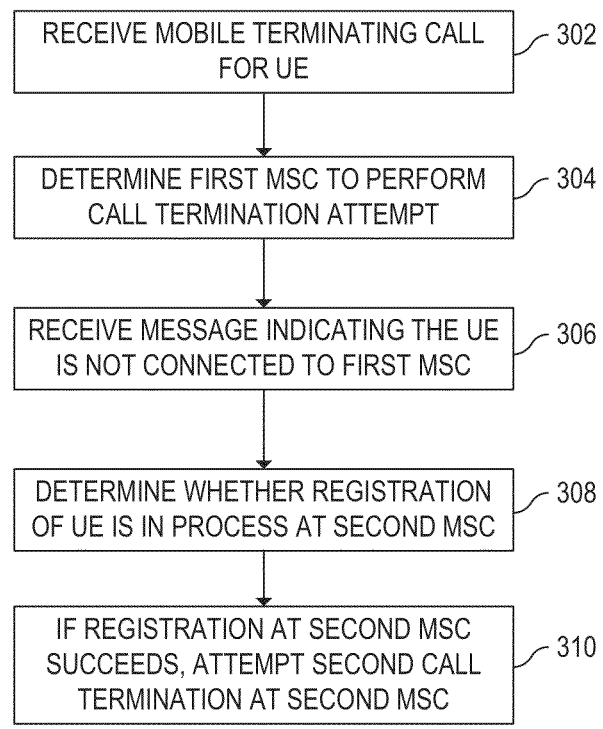
FIG. 3 is a flowchart of a method for implementing a CS call delivery, according to one example.

FIG. 3 is a flowchart of a method for implementing a CS call delivery, according to one example. Although execution of method 300 is described below with reference to HLR 114, other suitable components for execution of method 300 can be utilized (e.g., a CS network registration node). In addition, the components for executing the method 300 may be spread among multiple devices. Method 300 may be implemented in the form of executable instructions stored on one or more non-transitory machine-readable storage media and/or in the form of electronic circuitry.

Method 300 may begin with a mobile terminating call being initiated. At 302, the mobile terminating call for a UE is received at a HLR. For example, HLR 114 may receive the mobile terminating call for UE 106 from gateway MSC 116.

Method 300 may proceed to 304, where the HLR 114 determines a first MSC to perform a first call termination attempt for the mobile terminating call to. The determination can be based on location data. In certain examples, the HLR 114 can track locations of UEs based on information gathered from other devices, such as MSCs, VLRs, etc. A table, database, or other data structure can be used to store the location data. As such, location data can include information about the location and/or ways to communicate with respective UEs. This information can include, for example, infrastructure that can be used to connect to the respective UEs. In one example, the location data indicates that the first MSC 112 is a last registered MSC and/or VLR of the UE 106 known to the HLR 114.

The first call termination attempt can be initiated by sending a PRN request with a pre-paging supported parameter to the first MSC. In some examples, the HLR 114 can include a database that records parameters supported by the first MSC 112. In one example, the PRN request with pre-paging supported parameter is sent based on a determination at the HLR 114 that the first MSC 112 supports pre-paging. If the first MSC 112 does not support pre-paging, other procedures can be used.

The first call termination attempt can further include instructing the UE 106 to return to a CS network domain to receive the call. As such, in certain examples, the UE 106 can initially be connected to networking infrastructure on a PS domain 104. When the UE 106 receives the message, the UE 106 connects to a MSC.

In one example, the UE 106 returns to the first MSC 112. In this example, the first MSC 112 sends the HLR 114 routing information to allow the gateway MSC 116 forward the call to the UE 106.

In another example, the UE 106 does not return to the first MSC 112. The first MSC 112 can wait for a time duration, for example, in the order of 1 second, before determining that the UE 106 is absent from service by the first MSC 112. The time duration capability can be part of a specification and/or standard followed by the first MSC 112 that allows for pre-paging support. The first MSC 112 can send an absent subscriber message to the HLR, the absent subscriber indicating that the UE 106 is not connected to the first MSC 112.

At 306, the HLR 114 receives the message indicating that the UE 106 is not connected to the first MSC 112. As noted, the message can indicate that the UE 106 is an absent subscriber.

Then, at 308, the HLR 114 determines whether a registration of the UE 106 is in process at a second MSC within a first duration of time. This can occur in response to reception of the message indicating that the UE 106 is not connected to the first MSC 112. The HLR 114 can keep information about the UE 106 in a database. The information can include information, for example, a bit, about whether the UE 106 has initiated registration and/or authentication at a device in the CS domain 102, for example at a second MSC 118. Further, in some examples, location information about the second MSC 118 can also be stored with the information, for example, as location data. This information can be updated. If a registration is detected, then the HLR 114 can detect whether the registration is successful within a second duration of time. The durations can be within the order of a second. Further, in one example, the first duration and the second duration can be combined into a duration for which the UE 106 successfully registers at the second MSC 118.

At 310, if the registration is successful, for example, within the second duration of time, a second call termination attempt for the mobile terminating call is made via the second MSC 118. In one example, if the registration is successful within the duration, the second call termination attempt is made at the second MSC 118. The second call termination attempt can include instructing the UE 106 to return to a CS domain 102 to receive the mobile terminating call. This may be used in a case where the UE 106 makes another switch back to the PS domain 104 before the second MSC 118 has a chance to communicate with the UE 106.

In another example, if the registration is not successful within the second duration of time, the first call termination attempt is returned by the HLR 114 to the first MSC 112 for processing. In this example, the UE 106 can be considered absent and the call processing can proceed in accordance. As such, the call can be sent to voicemail or other such processing/call forwarding, etc. In one example, the HLR 114 can send the gateway MSC 116 a message saying that the connection was unsuccessful. The gateway MSC 116 can then respond with a busy signal, a notification that the subscriber is out of the service area, forwarding of the call to another number, forwarding the call to voicemail, or the like.

Figure 4:
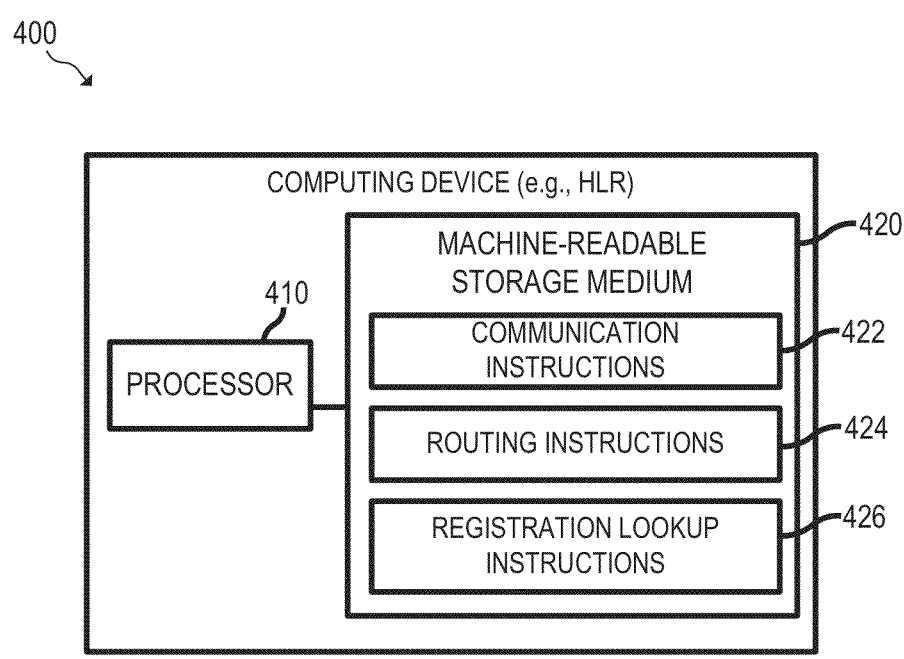
FIG. 4 is a block diagram of a computing device capable of implementing a CS call delivery, according to one example.

FIG. 4 is a block diagram of a computing device capable of implementing a CS call delivery, according to one example. The computing device 400 includes, for example, a processor 410, and a machine-readable storage medium 420 including instructions 422, 424, 426 for implementing CS call delivery. Computing device 400 may be, for example, an HLR, a server, notebook computer, a desktop computer, a workstation, or other electronic device that can implement an HLR or telecommunications infrastructure. As such, in certain examples, the computing device can be an HLR.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement the processes described herein, for example method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example; Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for implementing CS call deliver, for example, in accordance with method 300.

As with method 300, the process can begin with a mobile terminating call being initiated. The computing device 400 can receive a mobile terminating call for a UE. Communication instructions 422 can be executed to receive the call. Further, the computing device 400 can act as an HLR and receive the mobile terminating call for the UE from a gateway MSC.

Routing instructions 424 and registration lookup instructions 426 can be executed to determine a first MSC to perform a first call termination attempt for the mobile terminating call by sending a PRN request with a pre-paging supported parameter to the first MSC. The first call termination attempt can include instructing the UE to return to a CS network domain to receive the mobile terminating call. The communication instructions 422 can be used to send the PRN request to the first MSC.

The communication instructions 422 can also be executed to receive a message from the first MSC indicating that the UE is absent from the first MSC. This can be because the first MSC did not detect that the UE returned to the CS domain and connected to the first MSC after pre-paging the UE.

In response to the reception of the message, the processor 410 can determine whether the UE is in a process or registering with a second MSC. This can be done with reference to a timer. As such, the UE can be in the process of registering if the processor 410 can determine, from a database and/or other information, that the registration has been initiated, is being initiated, or has been completed within a first time limit.

If registration of the UE is in process and successfully completes the registration process within a second time limit, the processor 410 can further forward the mobile terminating call to the second MSC to perform a second call termination attempt.

In one example, this can correspond to the processor 410 determining that the UE has left the first MSC and registered at the second MSC. In one example, the second call termination attempt can further include instructing the UE to return to the CS network domain to receive the mobile terminating call. In another example, because the first MSC asked the UE to return to the CS network domain, the second MSC need not perform the instruction.

In another example, the processor 410 can cause forwarding of the mobile terminating call back to the first MSC if the registration of the UE at the second MSC does not successfully complete within the second time limit. In this scenario, the computing device 400 can determine that the UE is an absent subscriber and should be processed accordingly (e.g., forwarded to voicemail). In another scenario, the processor 410 can make the decision that the subscriber is absent and need not forward to the first MSC. Instead, the processor 410 can provide the information to the gateway MSC, which can process the call with the UE considered as an absent subscriber.

The above approaches allow for one network element (e.g., an HLR) to be modified instead of multiple network elements to provide efficient call delivery where multiple radio networks can cause location confusion. The features can be controlled at a single network element, for example, the HLR or AGI.

What is claimed is:

1. A method for implementing a circuit-switched (CS) call delivery comprising:
receiving a mobile terminating call for user equipment (UE) at a home location register (HLR);
determining, at the HLR, a first mobile switching center (MSC) to perform a first call termination attempt for the mobile terminating call based on location data by sending a provide roaming number (PRN) request with a pre-paging supported parameter to the first MSC, wherein the first call termination attempt includes instructing the UE to return to a CS network domain to receive the mobile terminating call;
receiving, at the HLR, a message from the first MSC indicating that the UE is not connected to the first MSC;
determining, at the HLR, whether a registration of the UE is in process at a second MSC within a duration of time in response to reception of the message from the first MSC; and
determining, at the HLR, whether the registration of the UE is successful, wherein, if the registration succeeds, a second call termination attempt for the mobile terminating call is made via the second MSC.

2. The method of claim 1, further comprising:
determining whether the registration is successful within a second duration of time.

3. The method of claim 2, wherein if the registration is successful within the second duration of time, the second call termination attempt is made at the second MSC, wherein the second call termination attempt includes instructing the UE to return to a CS network domain to receive the mobile terminating call.

4. The method of claim 3, wherein the received message indicates that the UE is an absent subscriber.

5. The method of claim 2, wherein if the registration is not successful within the second duration of time, the first call termination attempt is returned by the HLR to the first MSC for processing.

6. The method of claim 1, wherein the second call termination attempt is further based on capabilities of the first MSC and the second MSC, and
wherein the location data indicates that the first MSC is a last registered MSC of the UE known to the HLR.

7. The method of claim 1, wherein the CS call delivery uses technology that comprises at least one of a third generation (3G) network, a global system for mobile communications (GSM) network, a universal mobile telecommunications system (UMTS) network, a wideband code division multiple access (W-CDMA) network, and a time division synchronous code division multiple access (TD-SCDMA) network.

8. A home location register (HLR) for implementing a circuit-switched (CS) call delivery comprising:
a call routing module for receiving a mobile terminating call for a user equipment (UE);
a location module for determining a first mobile switching center (MSC) to perform a first call termination attempt for the mobile terminating call by the call routing module sending a provide roaming number (PRN) request with a pre-paging supported parameter to the first MSC, wherein the first call termination attempt includes instructing the UE to return to a CS network domain to receive the mobile terminating call;
wherein the call routing module receives a message from the first MSC indicating that the UE is absent from the first MSC; and
a registration module to determine whether the UE is in a process of registering with a second MSC within a duration of time in response to the message from the first MSC, wherein if a registration of the UE is in the process and successfully completes the registration process within a second duration of time, the call routing module further forwards the mobile terminating call to the second MSC to perform a second call termination attempt.

9. The HLR of claim 8, wherein the HLR comprises technology of at least one of a third generation (3G) network, a global system for mobile communications (GSM) network, a universal mobile telecommunications system (UMTS) network, a wideband code division multiple access (W-CDMA) network, and a time division synchronous code division multiple access (TD-SCDMA) network.

10. The HLR of claim 8, wherein if the registration of the UE at the second MSC does not successfully complete within the second duration of time, the call routing module further forwards the mobile terminating call back to the first MSC.

11. The HLR of claim 8, wherein the forwarding of the mobile terminating call to the second MSC is also based on whether the UE, the first MSC, the second MSC, or a combination thereof are configured for a call termination retry service.

12. The HLR of claim 8, wherein the UE leaves the first MSC and registers at the second MSC on a packet-switched (PS) network domain, and wherein the second call termination attempt includes instructing the UE to return to a CS network domain to receive the mobile terminating call.

13. A non-transitory machine-readable storage medium storing instructions for implementing a circuit-switched (CS) call delivery that, if executed by at least one processor of a device, cause the device to:
receive a mobile terminating call for a user equipment (UE);
determine a first mobile switching center (MSC) to perform a first call termination attempt for the mobile terminating call by sending a provide roaming number (PRN) request with a pre-paging supported parameter to the first MSC, wherein the first call termination attempt includes instructing the UE to return to a CS network domain to receive the mobile terminating call;
receive a message from the first MSC indicating that the UE is absent from the first MSC; and
in response to the reception of the message, determine whether the UE is in a process of registering with a second MSC within a first time limit,
wherein if a registration of the UE is in the process and successfully completes the registration process within a second time limit, further forward the mobile terminating call to the second MSC to perform a second call termination attempt.

14. The non-transitory machine-readable storage medium of claim 13, further comprising instructions that, if executed by the at least one processor, cause the device to:
forward the mobile terminating call back to the first MSC if the registration of the UE at the second MSC does not successfully complete within the second time limit.

15. The non-transitory machine-readable storage medium of claim 13, further comprising instructions that, if executed by the at least one processor, cause the device to:
determine that the UE has left the first MSC and registered at the second MSC, and wherein the second call termination attempt includes instructing the UE to return to a CS network domain to receive the mobile terminating call, wherein the device is a home location register.

* * * * *